March 27, 1962 C. M. HALSELL ETAL 3,026,706
METHOD AND APPARATUS FOR MASS FLOW MEASUREMENT
Filed May 28, 1958
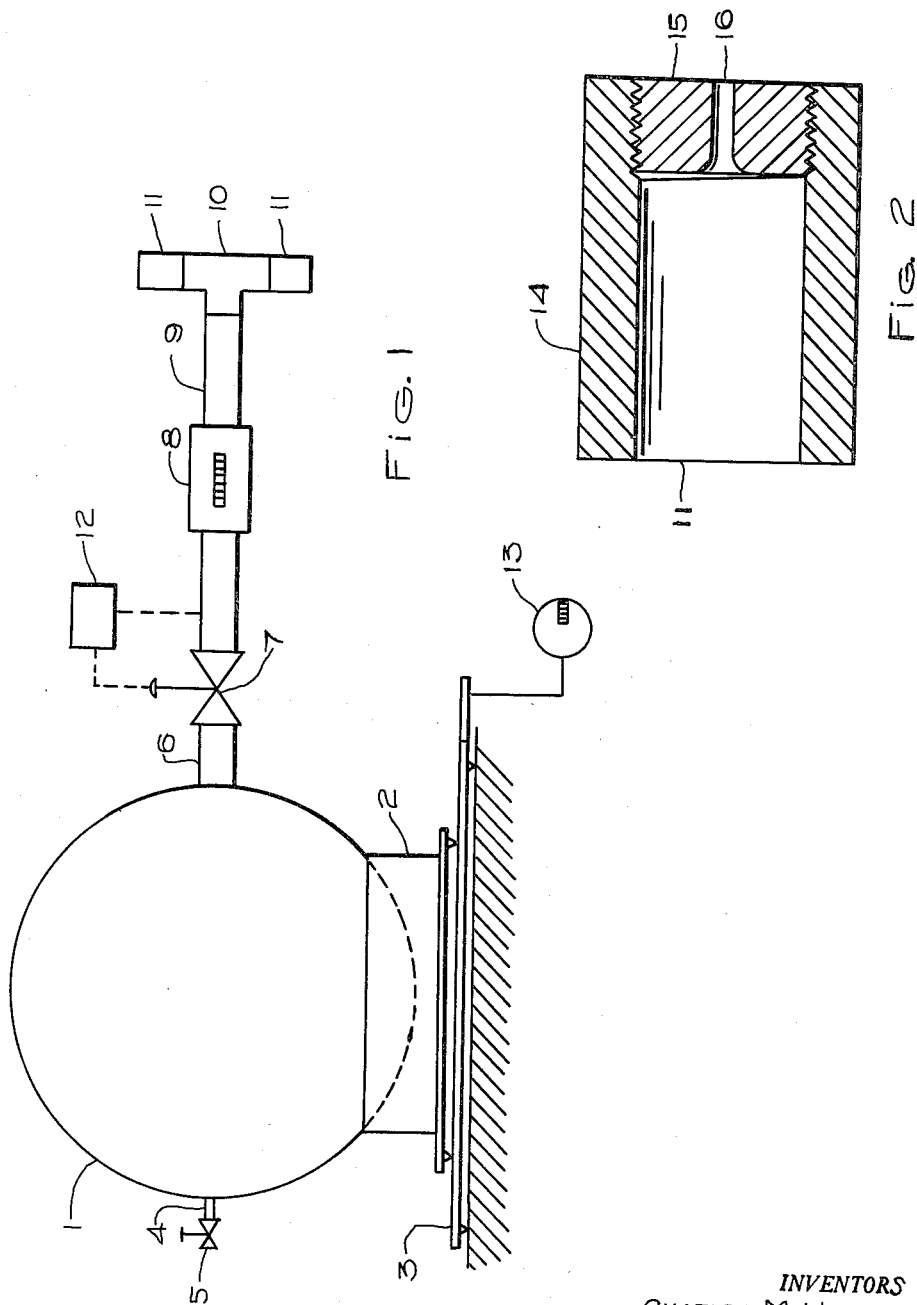
INVENTORS
CHARLES M. HALSELL &
BY ALFRED J. GOODWIN
ATTORNEY

United States Patent Office 3,026,706
Patented Mar. 27, 1962

3,026,706
METHOD AND APPARATUS FOR MASS
FLOW MEASUREMENT
Charles M. Halsell and Alfred J. Goodwin, Oklahoma City, Okla., assignors to Black, Sivalls & Bryson, Inc., Kansas City, Mo., a corporation of Delaware
Filed May 28, 1958, Ser. No. 738,450
5 Claims. (Cl. 73—3)

The present invention relates to a system and apparatus for use in checking, calibrating and proving mass flow meters and particularly for checking and proving mass flow meters on gaseous flow.

Prior to the present invention many types of mass flow meters have been developed. The inventors and manufacturers of these mass flow meters claim that they have accuracies which are of such large magnitude (that is, the errors of such meters are claimed to be extremely small) that they require new types of proving and calibration equipment which would have accuracy exceeding the claimed accuracy of the mass flow meters. Since these accuracy claims far exceed the accuracy of other measuring devices, particularly devices such as orifice meters, a more accurate system and apparatus are necessary to the proving, checking and calibration of mass flow meters for gas flow service. Therefore, the primary object of the present invention is to provide a device and a system for proving the gas flow measurement accuracy of mass flow meters.

A further object of the present invention is to provide a device and a system which will control and measure the flow through a mass flow meter. A still further object of the present invention is to provide a mass flow meter prover of greater accuracy than the accuracies claimed for mass flow meters. Another object of the present invention is to provide a mass flow meter proving system and device which will weigh the fluid flow through the mass flow meter which is being proven. Still another object of the present invention is to provide a mass flow meter prover device and system which nullify all outside effects such as exhaust thrust from its operation.

In accomplishing these and other objects of the present invention we have provided improved details of structure illustrated in the accompanying drawings wherein:

FIG. 1 is a schematic diagram of the system and apparatus of the present invention.

FIG. 2 is a detail sectional view of a suggested form of critical flow nozzle of the present invention.

Referring more in detail to the drawings:

The system of the present invention illustrated in FIG. 1 comprises spherical vessel 1, support base 2, beam scale 3 and connections to spherical vessel 1 on beam scale 3 so that not only vessel 1 and base 2 but all fixed attachments to spherical vessel 1 can be weighed by beam scale 3. It should be understood, however, that any means may be used for measuring the weight of spherical vessel 1 such as, for example, the use of strain gauges.

Charging duct 4 connects into spherical vessel 1 and is controlled by valve 5. Test duct 6 also connects into spherical vessel 1. Test duct 6 is connected through valve 7 to mass flow meter 8 which is to be tested. Downstream of mass flow meter 8 duct 9 connects into tee 10. Critical flow nozzles 11 connect to the arms of tee 10 and are constructed as illustrated in FIG. 2. Pilot 12 is connected into test duct 6 between valve 7 and mass flow meter 8 and also is connected to the operating mechanism of valve 7. Thus, by controlling the flow through duct 6 to mass flow meter 8 with valve 7, pilot 12 can control the pressure of the gas flowing through mass flow meter 8. Indicator 13 is connected to beam scale 3 to indicate the actual weight of the system of FIG. 1 which rests upon beam scale 3.

Critical flow nozzles 11 as illustrated in FIG. 2 are composed of sleeve 14 and insert 15. Insert 15 is externally threaded and screws into the outlet end of sleeve 14. Insert 15 has a central orifice 16 as shown in FIG. 2. Each orifice 16 for both critical flow nozzles 11 should be as close to the same dimensions and contour as possible for the reasons as hereinafter more fully explained.

In operation the system of the present invention is utilized by charging spherical vessel 1 with a gas at a pressure substantially above the desired flow test pressure. This charging of spherical vessel 1 is accomplished by connecting a source of gas pressure such as a compressor to valve 5. With valve 5 open spherical vessel 1 will be charged with gas under pressure. As soon as the pressure within spherical vessel 1 is sufficiently high to provide gas under desired flow test pressure for the desired test period, valve 5 should be closed and the source of gas pressure should be disconnected from valve 5. While spherical vessel 1 is being charged, valve 7 should be closed.

With spherical vessel 1 fully charged the total weight of the complete testing system components as registered on indicator 13 of beam scale 3 should be noted. Also, the indication of flow in mass flow meter 8 should be zeroed or noted. Further, pilot 12 should be set to control the pressure in mass flow meter 8 to the desired flow test pressure. The proving or calibration test is commenced by opening valve 7 and allowing the test gas to flow from spherical vessel 1 through test duct 6, valve 7, mass flow meter 8, duct 9, tee 10 and critical flow nozzles 11.

As soon as the pressure in spherical vessel 1 drops to a pressure near the desired flow test pressure, valve 7 should be closed to terminate the test. With the test terminated the total flow as registered by mass flow meter 8 and the weight of the system as registered on indicator 13 should be noted. Thus, the comparison of the difference in weight as indicated by indicator 13 of beam scale 3 as compared to the total weight flow as indicated by mass flow meter 8 will be sufficient to prove the accuracy of mass flow meter 8.

It should be noted that it is preferable that vessel 1 be spherical in shape in order to take advantage of a maximum weight of charged gas with a minimum vessel weight but any shape vessel may be used without departing from the spirit of the present invention. With the known weight of the system before and after a test and the initial and final meter readings it is possible to adjust the integrator of any meter to bring the meter into calibration.

The flow as previously mentioned is split in tee 10 to flow through critical flow nozzles 11. In order that the thrust of the exhausting gas will be balanced to eliminate any possible effect on the weight of the system as measured by beam scale 3. It is essential that the orifices 16 of each critical flow nozzle 11 be carefully matched in order to assure substantially the same thrust from each nozzle. The size of the orifices 16 controls the mass flow rate through the test system to a constant value since pilot 12 is set to operate valve 7 to obtain a constant pressure upstream of critical flow nozzles 11.

A suggested modification in the operation of the system would be to provide a means such as a camera for recording intermediate readings of indicator 13 and mass flow meter 8 during a flow test. This would be particularly advantageous since a short time period is necessary at the start of the test for valve 7 to respond and the test system to fill with the gas under pressure and establish a constant flow of gas through the test system. It is suggested that the flow system be designed to reduce unnecessary volume to a point which reduces the afore-mentioned start up period to a negligible time.

It is suggested that pressures and temperatures be taken and recorded to assure the proper functioning of the flow test system throughout its operation. Thus, it may be seen that we have provided a system device for calibrating and proving mass flow meters which actually measures the weight of test fluid flowing through the mass flow meter during a test.

What we claim and desire to secure by Letters Patent is:

1. A device for proving a mass flow meter comprising, a pressure vessel, means for charging said pressure vessel with gas under pressure, an outlet from said pressure vessel, a pressure regulating valve in said outlet, a restriction in said outlet, means for connecting a mass flow meter into said outlet between said pressure regulating valve and said restriction and means for weighing said pressure vessel and said outlet, said restriction comprising two nozzles connected to said outlet so that they exhaust in opposite directions.

2. The method of measuring mass flow to prove a mass flow meter comprising, pressurizing a proving system with a gas, weighing said pressurized system, exhausting gas from said system through a mass flow meter, balancing the thrust resulting from the flow of exhaust gas from said system, and weighing said system during the exhausting of said gas therethrough.

3. A device for proving a mass flow meter comprising, a pressure vessel, means for charging said pressure vessel with gas under pressure, an outlet from said pressure vessel, a pressure regulating valve in said outlet, a pair of opposed restrictions in said outlet, means for connecting a mass flow meter into said outlet between said pressure regulating valve and said restriction and means for weighing said pressure vessel, said mass flow meter, said regulating valve and said outlet.

4. A system for proving mass flow meters comprising, a pressure vessel, means for charging said pressure vessel with a gas, an outlet duct from said pressure vessel, a valve in said outlet duct to control the pressure of gas flowing through said outlet duct, an orifice in said outlet duct, means associated with said outlet duct for installing a mass flow meter in said outlet duct between said valve and said orifice, means for counterbalancing the thrust created by the flow of gas through said orifice and means for continuously measuring the weight of said vessel and its contents, said valve, said outlet, said orifice and said meter.

5. The method of measuring mass flow to prove a mass flow meter comprising, pressurizing a proving system with a gas, weighing said pressurized system, flowing the gas from said system through a mass flow meter, dividing said gas flowing from said mass flow meter into two substantially equal streams, exhausting one of said divided gas flow streams in a direction opposite to the direction of exhaust of the other of said divided gas flow streams and weighing said system during the exhausting of said gas therethrough.

References Cited in the file of this patent
UNITED STATES PATENTS

| | | |
|---|---|---|
| 1,536,614 | Mackey | May 5, 1925 |
| 1,830,311 | Clark | Nov. 3, 1931 |
| 1,934,291 | Baas | Nov. 7, 1933 |
| 2,710,537 | Schuler et al. | June 14, 1955 |

OTHER REFERENCES

Publication: ASME Transactions, July 1953, pages 835–841 "A Fast Response True Mass Rate Flowmeter," by Li et al. (Copy in 73–194M.)